United States Patent
Jain et al.

(10) Patent No.: US 11,620,214 B2
(45) Date of Patent: Apr. 4, 2023

(54) TRANSACTIONAL ALLOCATION AND DEALLOCATION OF BLOCKS IN A BLOCK STORE

(71) Applicant: NUTANIX, INC., San Jose, CA (US)

(72) Inventors: Rohit Jain, Cupertino, CA (US); Tabrez Parvez Memon, Campbell, CA (US); Pradeep Kashyap Ramaswamy, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 17/161,323

(22) Filed: Jan. 28, 2021

(65) Prior Publication Data

US 2022/0138097 A1      May 5, 2022

Related U.S. Application Data

(60) Provisional application No. 63/108,142, filed on Oct. 30, 2020.

(51) Int. Cl.
     *G06F 12/02*      (2006.01)
     *G06F 11/14*      (2006.01)
     *G06F 12/0868*      (2016.01)

(52) U.S. Cl.
     CPC ...... *G06F 12/0246* (2013.01); *G06F 11/1471* (2013.01); *G06F 12/0868* (2013.01)

(58) Field of Classification Search
     CPC ............. G06F 12/0246; G06F 11/1471; G06F 12/0868
See application file for complete search history.

(56) References Cited

U.S. PATENT DOCUMENTS

| | | | |
|---|---|---|---|
| 6,185,663 B1 * | 2/2001 | Burke | G06F 11/1471 |
| | | | 714/E11.13 |
| 6,571,259 B1 * | 5/2003 | Zheng | G06F 16/10 |
| 6,678,809 B1 * | 1/2004 | Delaney | G06F 3/067 |
| | | | 707/999.204 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Tasnima Matin
(74) *Attorney, Agent, or Firm* — Artegis Law Group, LLP

(57) ABSTRACT

Various embodiments set forth techniques for transactional allocation and deallocation of blocks in a block store. A first technique includes sending a first request that causes a non-persistent allocation of a block. The first technique also includes adding a first entry in a log recording the allocation as tentative, sending a second request that causes persistence of the allocation, and adding a second entry in a log recording the allocation as finalized. A second technique includes adding a first entry in a log recording a deallocation of a block, sending a first request that causes the deallocation of the block and causes the block to be unavailable for reallocation in a non-persistent manner, adding a second entry in the log recording that the deallocation is finalized, and sending a second request that causes the block to be made available for reallocation.

30 Claims, 8 Drawing Sheets

(56) References Cited

U.S. PATENT DOCUMENTS

| | | | |
|---|---|---|---|
| 7,487,228 B1* | 2/2009 | Preslan | H04L 67/1002 709/219 |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 2005/0091391 A1* | 4/2005 | Burton | G06F 11/2074 714/E11.107 |
| 2008/0077590 A1 | 3/2008 | Pandit | |
| 2010/0049718 A1* | 2/2010 | Aronovich | G06F 21/6218 707/607 |
| 2015/0186043 A1* | 7/2015 | Kesselman | G06F 3/067 711/162 |
| 2015/0347310 A1* | 12/2015 | Ish | G06F 12/0871 711/3 |
| 2017/0277709 A1* | 9/2017 | Strauss | G06F 3/064 |
| 2019/0188098 A1* | 6/2019 | Gupta | G06F 11/1446 |
| 2019/0243732 A1* | 8/2019 | Tati | G06F 3/0619 |
| 2021/0334236 A1* | 10/2021 | Wang | G06F 16/182 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

"Accelerate Your NVMe Drives with SPDK", Published Sep. 30, 2016, https://software.intel.com/content/www/us/en/develop/articles/accelerating-your-nvme-drives-with-spdk.html, 13 pages.

"Zoned Storage Overview", https://zonedstorage.io/introduction/zoned-storage/, 6 pages.

Kwon et al, "Strata: A Cross Media File System", https://www.cs.utexas.edu/~simon/sosp17-final207.pdf, 18 pages.

Pillai et al, "Application Crash Consistency and Performance with CCFS", https://www.usenix.org/system/files/conference/fast17/fast17_pillai.pdf, 17 pages.

Bokovoy, "Journaled File Systems comparison", https://www.samba.org/~ab/journaled-fs-draft.pdf, 11 pages.

Chen et al., "A New Design of Journaling for File Systems to Provide Crash Consistency", https://www.semanticscholar.org/paper/sJournal%3A-A-New-Design-of-Journaling-for-File-to-Chen-Tan/8c6766c65c0da5e65e60c80f558af46e4063910b, 10 pages.

\* cited by examiner

TRANSACTIONAL ALLOCATION AND DEALLOCATION OF BLOCKS IN A BLOCK STORE

CROSS-REFERENCE TO RELATED APPLICATIONS

This application claims the benefit of U.S. Provisional Application No. 63/108,142, titled "TRANSACTIONAL ALLOCATION AND DEALLOCATION OF BLOCKS IN A BLOCK STORE," filed on Oct. 30, 2020, the subject matter of which is incorporated by reference herein in its entirety.

TECHNICAL FIELD

The contemplated embodiments relate generally to management of storage in a computing system and, more specifically, to transactional allocation and deallocation of blocks in a block store.

BACKGROUND

File systems, such as ext4, and other client applications running on a computing system, routinely perform tasks that result in the allocation and deallocation of blocks in a block store. For most typical file systems, the allocation and deallocation of blocks is performed in a crash-consistent manner so that in the event of crash, the file system can be recovered to a stable "pre-crash state" in a graceful manner and without any double-allocations of blocks and/or leaks when blocks are allocated and then never referenced.

One solution to the crash-consistency problem is to use journaling. However, in a file system or client application where the underlying block management layer provides a direct block allocation/deallocation API to the file system or client application, two journals end up being kept, (1) the journal that the block store keeps (e.g., recording allocations and deallocations of blocks in the block store) and (2) the journal that the file system or application keeps (e.g., recording application programming interface (API) calls to transact/allocate files or other structures using blocks from the block store, and recording API calls to transact/deallocate the files or other structures). As a result, the file system/client application and an allocator or manager associated with the block store perform input/output (I/O) to keep their respective journals up to date. This is wasteful of I/O resources. In addition, in the event of crash or other failure, there may be a discrepancy between the two journals, which can result in double allocations and/or leaks.

Accordingly, there is need for improved techniques for providing crash-consistency when allocating and deallocating blocks in a block store.

SUMMARY

Various embodiments of the present disclosure set forth a method for allocating a block in a block store. The method includes sending a first request to a block allocator, the first request causing a non-persistent allocation of a block, wherein the block is associated with a block identifier; adding a first entry in a log, the first entry recording the block identifier and indicating a tentative status for the allocation; sending a second request to the block allocator, the second request causing persistence of the allocation; and adding a second entry in a log, the second entry indicating a finalized status for the allocation.

Various embodiments of the present disclosure set forth a method for deallocating a block in a block store. The method includes adding a first entry in a log, the first entry recording a block identifier of a block; sending a first request to a block allocator, the first request causing deallocation of the block, and causing the block to be unavailable for reallocation by causing the block identifier to be recorded in a data structure in non-persistent memory; adding a second entry in the log, the second entry indicating a finalized status for the deallocation; and sending a second request to the block allocator, the second request causing the block to be made available for reallocation.

Other embodiments include, without limitation, a system that implements one or more aspects of the disclosed techniques, and one or more non-transitory computer readable media including instructions for performing one or more aspects of the disclosed techniques.

At least one technical advantage of the disclosed techniques is that allocation and deallocation transactions in the block store use less resources compared to conventional techniques. Because one journal is kept, at the file system or client, to record allocation and deallocation transactions, less resources (e.g., I/O) are consumed to keep the journal up to date, compared to keeping multiple journals in conjunction with conventional techniques. Another technical advantage is that the allocation or deallocation transaction is crash-consistent throughout the transaction. Because one journal is kept, at the file system or client level, there is no issue of discrepancy between separate journals being kept by different a block management system and a file system or client. Recovery from a crash includes conforming block allocations to the one journal. Accordingly, there is no discrepancy between block allocations/deallocations and file system or client allocations/deallocations. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Block Stores

Figure 1:
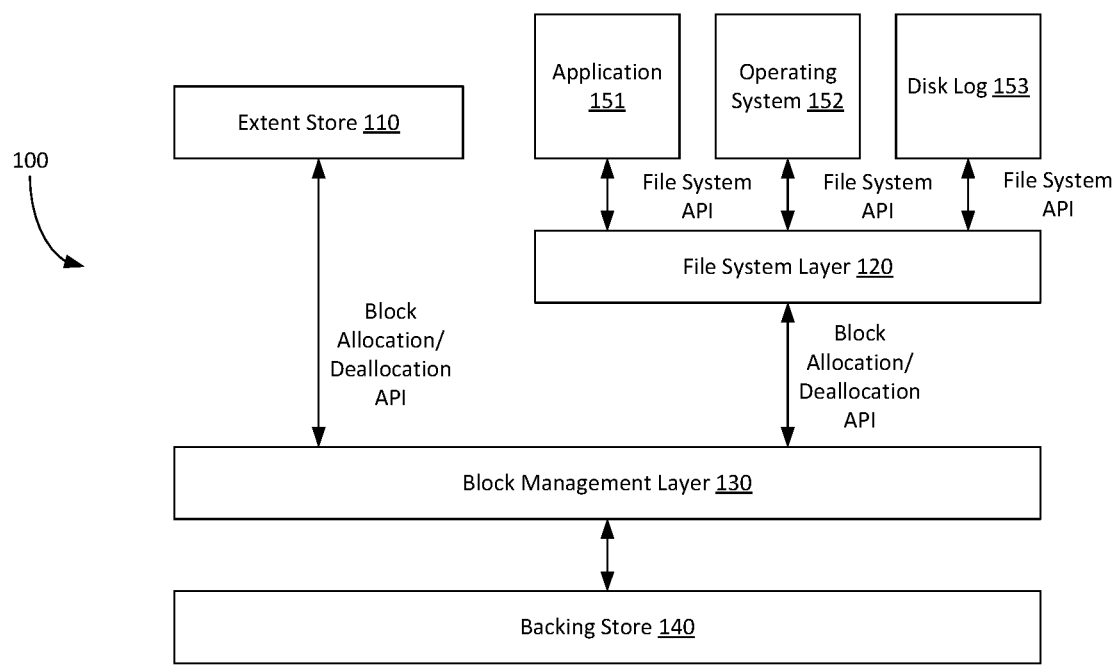
FIG. 1 is a block diagram illustrating a block store according to various embodiments of the present disclosure.

FIG. 1 is a block diagram illustrating a block store 100 according to various embodiments of the present disclosure. As shown in FIG. 1, block store 100 can be implemented around a backing store 140. Backing store 140 is a linearly addressable storage entity. In some embodiments, backing store 140 can be a physical storage device (e.g., a hard disk drive (HDD), a solid-state drive (SSD), a non-volatile memory express (NVMe) device, Optane memory, etc.), a virtual storage device (e.g., a vDisk), or a non-persistent linearly addressable device (e.g., DRAM). Block store 100 can provide several services for accessing backing store 140.

Block store 100 can include a block management layer 130. Block management layer 130 is responsible for allocation and deallocation of blocks of storage in backing store 140. Block management layer 130 can include a block allocator module or application that performs various block allocation and deallocation operations, including but not limited to receiving allocation and deallocation requests, making non-persistent allocations and deallocations, persisting allocations and deallocations, and reporting allocations and deallocations. Block management layer 130 can provide a block allocation/deallocation application programming interface (API) that may be used by other parts of block store 100 (e.g., by extent store 110 and/or file system layer 120). In some embodiments, block store 100 is formatted prior to use via a block store format operation. The block store format operation takes as an argument a minimum block size (e.g., 8 KB) that block store 100 supports. Each block of minimum block size can be associated with a block identifier ("block ID"). The block ID of a block can be used to access the block in backing store 140 directly. Multiple blocks can be accessed via multiple block IDs. For example, a contiguous set of blocks can be accessed via a block ID of the first block in the contiguous set and a number indicating a number of contiguous block IDs starting from the block ID of the first block in the set.

In some embodiments, the block allocation/deallocation API provided by block management layer 130 implements a number of functions or calls associated with allocation and deallocation of blocks in backing store 140. The functions or calls provided by the block allocation/deallocation API can include an allocation call (e.g., "Allocate( )"), a deallocation call (e.g., "Deallocate( )"), an allocation finalization call (e.g., "FinalizeAllocation( )"), and a deallocation finalization call (e.g., "FinalizeDeallocation( )"). Extent store 110 and/or File system layer 120 can issue these calls via the block allocation/deallocation API in block allocation and deallocation transactions. Block allocation and deallocation transactions, and their associated calls, are further described below in conjunction with FIGS. 2-3.

Allocations and deallocations of blocks in block store 100 can be performed using an entity called a component. In some embodiments, an application, such as any of application 151, operating system 152, disk log 153, and/or the like, can register multiple components in a single block store instance. When registering a component, the application can provide a block size that is a multiple of the minimum block size provided during block store formatting. This way, every component can have its own block size. Examples of components can include, without limitation, an oplog store, a RocksDB, a write-ahead log ("WAL") (e.g., disk log 153), or an extent store (e.g., extent store 110).

In some embodiments, each component object provides the block allocation/deallocation API. In some embodiments, each component allocates from a separate region (or separate set of regions) in backing store 140 at any given time minimizing allocation interference between various components. For example, random allocations and deallocations by an extent store 110 will not impact sequential allocations by a file system component used by one of the applications 151-153.

In some embodiments, block management layer 130 maintains a set of allocator pages in a persistent manner (e.g., on disk or in other persistent or non-volatile memory or storage). Each allocator page can be organized as a bitmap, where each bit represents a block ID in the space of block IDs. The size of the allocator page can be a unit of atomic I/O on disk (e.g., 4 KB for solid state drives). For example, a single allocator page can include $2^{12}$ bytes=$2^{15}$ bits, which represents $2^{15}$=32768 block IDs. Accordingly, one allocator page can represent a first consecutive sequence of block IDs (e.g., IDs 0-32767), another allocator page can represent the next consecutive sequence of block IDs (e.g., IDs 32768-65535), and so on. In some embodiments, backing store 140 is divided into regions, where each region is a portion of storage that can be managed by one allocator page; each allocator page is associated with a different region of backing store 140. A component can allocate or deallocate storage in region(s) associated with that component via allocator pages corresponding to those regions.

In some embodiments, block management layer 130 also maintains one or more allocation heaps in a persistent manner (e.g., on disk or in other persistent or non-volatile memory or storage). The allocation heap data structure is a heap data structure (e.g., a sparse heap) that stores a set of allocator pages associated with a component, and accordingly tracks the allocated block IDs and free blocks IDs. Further, the allocation heap data structure aids in the efficient search for free block IDs. In some embodiments, each component has its own allocator heap storing the set of allocator pages associated with the component.

In some embodiments, there is no hard partitioning of space among components, and each component can dynamically allocate and deallocate free regions of backing store 140.

A file system layer 120 sits on top of block management layer 130. For example, file system layer 120 may be consistent with ext4. File system layer 120 provides a file system API usable by applications 151-153. In some embodiments, file system layer 120 provides a POSIX-like file system API to applications 151-153. File system layer 120 is used by those parts of applications 151-153 that do not manage metadata for block store 100 at a block level, but rather at a file level. For example, the file-system backend used by disk log 153 uses the file system layer 120 to create delta and checkpoint files. As other examples, additional applications (not shown) use the file system layer 120 to manage episode files, database files, and/or the like.

In some embodiments, file system layer 120 uses B+Trees to store the blocks backing the files. For example, a file descriptor of a file can be an inode identifier ("inode ID"), which in turn is a pointer to a root block of the B+Tree containing the blocks backing the file. The key in the file descriptor is the logical block address (LBA) and the value is an extent-like structure which provides the starting block ID and the number of blocks backing the space for the file starting at a given LBA. Minimal metadata about the file (e.g., the size and the time of last modification) can be kept as a special key-value pair in the B+Tree.

In some embodiments, file system layer 120 implements directories using B+Trees to store mappings from file names to the corresponding inode IDs and inode types. The inode ID for a file points to the root node of the B+Tree for that file, and the mode ID for a directory points to the root node of the B+Tree for that directory.

In some embodiments, application 151 can be any application that manipulate (e.g., create, modify, remove) one or more files that can be stored in backing store 140 in conjunction with the functionality of the application. In some embodiments, operating system 152 can be any system software that manages resources, including manipulating (e.g., create, modify, remove) files that can be stored in backing store 140. In some embodiments, disk log 153 (e.g., a write-ahead log) implements a journal that logs allocation and deallocation transactions, as further described below.

In some embodiments, an extent store 110 manages data in units of "extent groups," which are stored as individual files in a file system on a storage device (e.g., backing store 140). When an extent group is to be accessed, extent store 110 looks up its own metadata store for information about which offsets (e.g., starting block ID and a number of following block IDs) in the corresponding file need to be accessed for a particular extent. Extent store 110 can then make calls to block management layer 130 with the offset information to access the extent group.

Transactional Allocation and Deallocation of Blocks in a Block Store

In some embodiments, when using file system layer 120 (e.g., a file system layer of ext4), storage is allocated in the context of a filename provided by an application (e.g., applications 151-153) and managed by file system layer 120. If the application crashes during allocation, the allocated storage is not "leaked" because the application continues to use the same file name and file system layer 120 tracks the extents and/or blocks allocated for that file name. However, to avoid leakage in block store 100, the block allocations performed by a block allocator of a block management layer 130 can be made transactional so that any allocations that file system layer 120 believes have been made are consistent with the actual block allocations made by block management layer 130. However, because block management layer 130 is not aware of the file name for which file system layer 120 is requesting an allocation, leaks can occur when block management layer 130 allocates blocks and a crash occurs before file system layer 120 can properly associate them with the filename. These leaks can be addressed by using a two-phase commit protocol for the allocation transactions performed by file system layer 120 or another client when both file system layer 120 or client and block management layer 130 execute in a same process.

In various embodiments, an allocation transaction is performed between a client (e.g., file system layer 120, extent store 110) and block management layer 130, with a two-phase commit protocol. In a first phase, a client issues to block management layer 130 a request for an allocation of one or more blocks. The request can include, for example, a desired number of blocks. Responsive to the request, block management layer 130 allocates the blocks in a non-persistent manner (e.g., record the allocation in a data structure in non-persistent memory or non-persistent storage) and returns the identifiers (e.g., block IDs) of the allocated blocks to the client. The client logs the allocation in a journal (e.g., as a tentative allocation). After the tentative allocation is logged, the client can make use of the allocated blocks (e.g., for the file for which the allocation was requested).

In a second phase following the first phase, the client issues to block management layer 130 a request to finalize the allocation. Responsive to that request, block management layer 130 updates one or more allocator data structures in a persistent manner (e.g., on disk) based on the allocation, thereby making the allocation persistent, and reports that the update is complete. The client then logs the completion of the update in a journal (e.g., as a finalized allocation).

The two-phase allocation transaction is crash-consistent throughout. For example, if a crash occurs before the tentative allocation is logged in the journal, the allocation at block management layer 130 is lost, and the client can abort or re-request the allocation upon recovery. If a crash occurs after the tentative allocation is logged in the journal, block management layer 130 is expected to conform to the fact that the allocation is logged in the journal. For example, after the crash, the client can request that block management layer 130 to update the allocator data structures based the logged tentative allocation.

Figure 2:
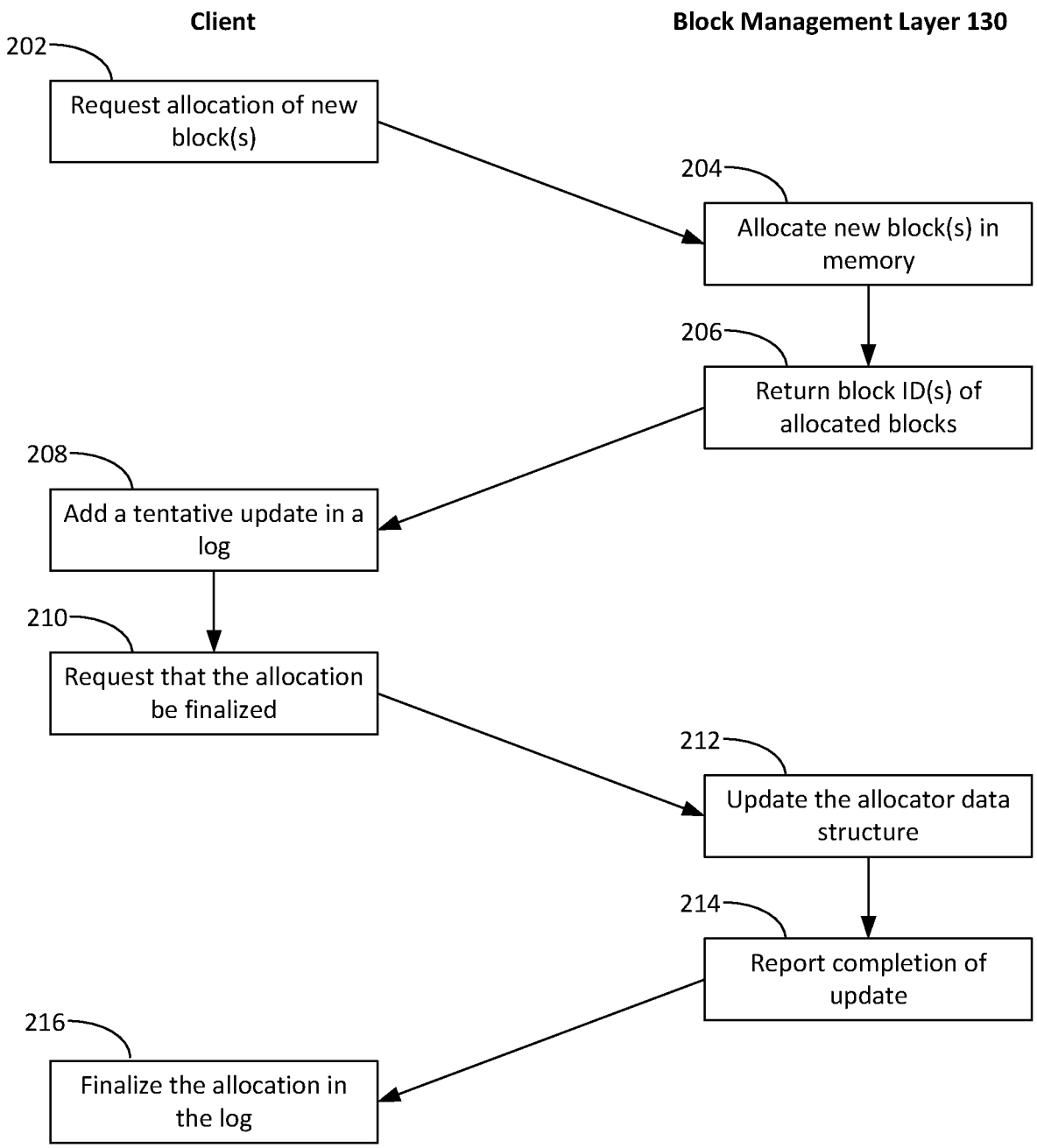
FIG. 2 is a flow chart of method steps for allocating blocks in a block store, according to various embodiments of the present disclosure.

FIG. 2 is a flow chart of method steps for allocating blocks in a block store, according to various embodiments of the present disclosure. In some embodiments, the method steps of FIG. 2 may be performed by any computing device or system implementing block store 100, such as any of the computing systems disclosed in FIGS. 4A-5 disclosed herein. In various embodiments, FIG. 2 shows method steps associated with the two-phase allocation transaction described above.

As shown in FIG. 2, a method 200 begins at a step 202 where a client (e.g., file system layer 120 or another application, extent store 110) requests that the block allocator of block management layer 130 allocate one or more new blocks, such as for a newly created file. In various embodiments, file system layer 120 receives a request for block(s) of storage from an application (e.g., application 151, operating system 152, etc.). The application can issue the request to file system layer 120 via the file system API. Responsive to the request from the application, file system layer 120 issues, via the block allocation/deallocation API, a call (e.g., Allocate( )) to block management layer 130 to allocate the block(s). At this step 202, the call to allocate the block(s) is not yet added to a log (e.g., file system layer 120 does not log the allocation call in disk log 153).

At a step 204, the block allocator of block management layer 130 allocates the one or more new blocks in memory. At this step, the block allocator makes the allocations non-persistently (e.g., records the allocation in non-persistent or other volatile memory or storage). For example, the block allocator can record the allocation in a data structure in volatile memory.

At a step 206, the block allocator of block management layer 130 returns the block IDs associated with each of the one or more new blocks to the client. The block allocator can transmit a signal, a message, and/or the like to the client (e.g., file system layer 120, etc.). The signal, message, and/or the like can include the block IDs of the set of allocated blocks.

If a crash happens up to step 206, the allocation is lost because nothing about the allocation has been added to a log (e.g., to disk log 153). That is, when the crash occurs up to step 206, both the client and block management layer 130 experiences the crash, and accordingly the non-persistent allocation and the block IDs returned to the client are lost. That is, at block management layer 130, any record of the allocation is lost, and the blocks are still listed as unallocated. At the client, the log or journal contains no record of the allocation, but the request for blocks of storage from the application may still be outstanding. Accordingly, the allocation transaction is considered to not have occurred. Upon recovery from the crash, the client can either abort the allocation or re-request the allocation starting from step 202.

In the absence of a crash, at a step 208, the client records a tentative update in the log with the newly allocated block ids. For example, the client can write an entry into disk log 153. The entry can include the block IDs of the allocated blocks, as well as an indication that the entry and/or the allocation to which the entry corresponds is tentative (e.g., via a bit flag or any other technically feasible manner). The entry can also include an association between the allocated blocks and an entity (e.g., a file) for which the blocks are allocated (e.g., a mapping between the block IDs and an identifier of the file for which the blocks are allocated). Accordingly, the client journals the allocation tentatively. In some embodiments, upon the completion of step 208, the client can start using the one or more new blocks for storage.

At a step 210, the client issues a request to the block allocator of block management layer 130 to finalize the allocation. For example, file system layer 120 can issue, via the block allocation/deallocation API, a call (e.g., FinalizeAllocation( )) to block management layer 130 to finalize the allocation. In some embodiments, the client can issue the request in parallel with using the new blocks for storage. In some embodiments, the call to finalize the allocation can include the block IDs of the allocated blocks.

At a step 212, the block allocator of block management layer 130 updates one or more allocator data structures, which may be stored in the block store. The block allocator can, for example, update the bitmap of an allocator page associated with the client and/or update an allocator heap associated with the client. As described above, the allocator page and/or the allocator heap are maintained persistently (e.g., on disk). In some embodiments, the block allocator records into the allocator data structure(s) the allocation that was recorded non-persistently in step 204. For example, the block allocator can write the allocation from memory onto disk. Accordingly, updating the allocator data structures makes the allocation persistent. In some embodiments, the update to the allocator data structure(s) may be combined with other allocator data structure updates (e.g., updates associated with other allocation and/or deallocation transactions), which further reduces the overhead of step 212.

After the allocator data structure(s) are updated, at a step 214, block management layer 130 notifies the client that the update is complete. The block allocator can transmit a signal, a message, and/or the like to the client (e.g., file system layer 120, etc.). The signal, message, and/or the like reports to the client the completion of the update of the allocator data structures, thereby reporting the persistence of the allocation.

At a step 216, upon receiving confirmation from block management layer 130 that the allocator data structure(s) are updated, the client finalizes the allocation in the log (e.g., disk log 153). In some embodiments, the finalization of the allocation transaction in the log may be combined with the finalization of other allocation transactions in the log, which further reduces the overhead of step 212. In some embodiments, the finalization of the allocation transaction in the log includes adding an entry in the log that indicates that the allocation associated with the tentative update recorded in step 208 is complete. Accordingly, the log can include, for a given completed allocation transaction, an entry that indicates that the allocation is tentative and an entry that indicates that the allocation is complete. Thus, upon recovery from a crash, allocations recorded in the log can be checked for completeness by checking whether a tentative allocation entry has a corresponding completed allocation entry in the log.

If a crash were to happen after step 208, the client processes the tentative update from the log upon recovery and can either choose to abort the allocation transaction or continue with the allocation transaction. If the client chooses to continue with the allocation transaction, the client notifies the block store of the tentative update and the allocated block IDs, so that block management layer 130 can rebuild the block-allocation state for the block IDs in memory and/or update the allocator data structures (e.g., update the allocator page, update the allocator heap). For example, the client can re-request that the allocation be finalized, as in step 210. If the allocation data structures have not been updated as in step 212, then responsive to the re-request, block management layer 130 can proceed from step 212 based on the re-request and the block IDs included therein. If the allocator data structures has already been updated as in step 212, then responsive to the re-request, block management layer 130 can omit step 212 (because the allocator data structures are already persisted) and proceed from step 214. If the client chooses to abort the allocation transaction, the client notifies block management layer 130 of the abort and the allocated block IDs, so that block management layer 130 can de-allocate the blocks associated with the block IDs if the allocator data structure of block management layer 130 has already been updated.

In some embodiments, the deallocation of storage by a client may run the risk of a double allocation of the deallocated blocks. This can occur when the client requests the deallocation of blocks and the blocks are deallocated by the block allocator of the block management layer 130 and then a crash occurs before the client is informed of the successful deallocation. During crash recovery, the client may again request that the blocks be deallocated, but in the interim the blocks may have been allocated by the block allocator for another purpose. Thus, the deallocation during the recovery may make the blocks available for reallocation with the results that the blocks get allocated twice for two different purposes. These double allocations can be addressed by using a two-phase commit protocol for the deallocation transactions performed by file system layer 120 or another client when both file system layer 120 or client and block management layer 130 execute in a same process.

In various embodiments, a deallocation transaction is performed between a client (e.g., file system layer 120, extent store 110) and block management layer 130, with a two-phase commit protocol. In a first phase, a client first logs a deallocation of one or more blocks in a journal (e.g., as a tentative deallocation), and then issues to block management layer 130 a request for deallocation of the blocks. The request can include, for example, the block IDs of the blocks for which deallocation are requested. Responsive to the request, block management layer 130 deallocates the blocks persistently by updating one or more allocator data structures (e.g., on disk). Further, block management layer 130 also places a reallocation hold or lock on the deallocated blocks non-persistently, to prevent those blocks from being reallocated until the deallocation is finalized. The hold can be placed by, for example, recording the block IDs of the deallocated blocks in a reallocation hold data structure in volatile memory. After the deallocation and placing of the hold, block management layer 130 reports the deallocation to the client.

In a second phase following the first phase, responsive to the report of the deallocation, the client logs the completion of the deallocation (e.g., as a finalized deallocation). The client then issues to block management layer 130 a request to finalize the deallocation. Responsive to that request, block management layer 130 removes the reallocation hold on the deallocated blocks (e.g., by removing the block IDs of the deallocated blocks from the reallocation hold data structure), thereby releasing the deallocated blocks for reallocation.

The two-phase deallocation transaction is crash-consistent throughout. For example, if a crash occurs before the finalized deallocation is logged, then the client can re-issue the deallocation request to block management layer 130. Block management layer 130 conforms the allocator data structures to the request by updating the allocator data structures and placing the reallocation hold based on the re-request, or confirming that the allocator data structures have been updated. If a crash occurs after the finalized deallocation is logged, then the reallocation hold is automatically lost with the crash, and the client and block management layer 130 do not need to take further action with respect to the deallocation transaction; the deallocation is effectively finalized with the loss of the reallocation hold.

Figure 3:
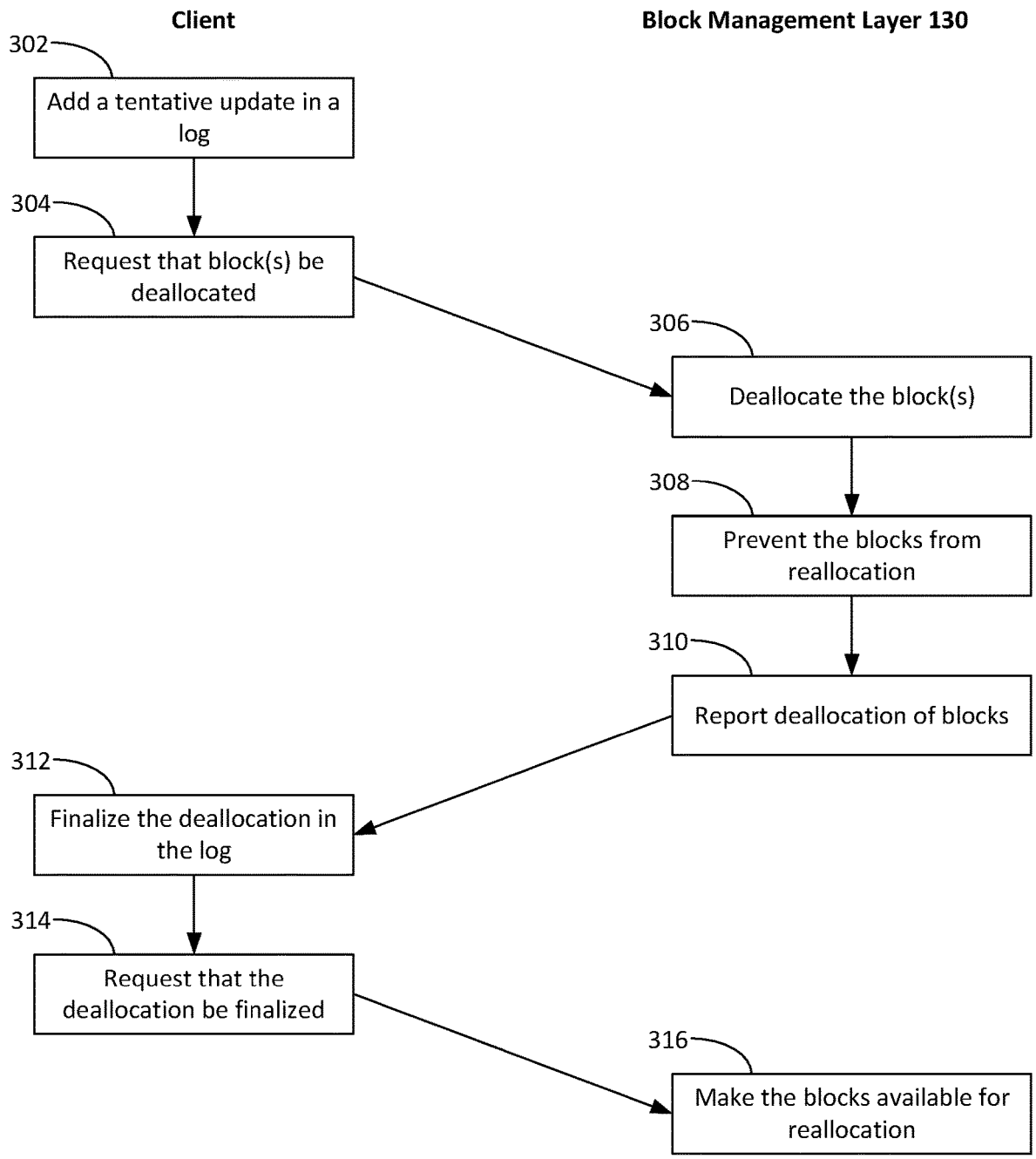
FIG. 3 is a flow chart of method steps for deallocating blocks in a block store, according to various embodiments of the present disclosure.

FIG. 3 is a flow chart of method steps for deallocating blocks in a block store, according to various embodiments of the present disclosure. In some embodiments, the method steps of FIG. 3 may be performed by any computing device or system implementing block store 100, such as any of the computing systems disclosed in FIGS. 4A-5 disclosed herein. In various embodiments, FIG. 3 shows method steps associated with the two-phase deallocation transaction described above.

As shown in FIG. 3, a method 300 begins at a step 302 where a client (e.g., file system layer 120 or another application, extent store 110) begins a deallocation transaction by recording a tentative update with the block IDs of one or more blocks to be deallocated in a log (e.g., in disk log 153). In various embodiments, file system layer 120 receives a request for deallocation of block(s) of storage from an application (e.g., application 151, operating system 152, etc.). The application can issue the request to file system layer 120 via the file system API. Responsive to the request from the application, file system layer 120 records a tentative update to disk log 153 indicating the block IDs of the blocks for which deallocation is requested.

In the absence of a crash, or if the client chooses to continue after a recovery, at a step 304, the client sends a deallocation request with the block IDs of the one or more blocks to deallocate to the block allocator of block management layer 130. File system layer 120 issues, via the block allocation/deallocation API, a call (e.g., Deallocate( )) to block management layer 130 to deallocate the block(s).

At a step 306, the block allocator of block management layer 130 deallocates the one or more blocks by updating one or more allocator data structures maintained by block management layer 130 (e.g., an allocator page, an allocator heap). In some embodiments, the allocator data structure may be stored in the block store. The update of the allocator data structure(s) makes the deallocation persistent.

However, to avoid multiple reallocation of these one or more deallocated blocks, at a step 308, block management layer 130 makes a record in memory (e.g., in non-persistent or other volatile memory) that the deallocated one or more blocks are not yet available for reallocation. For example, block management layer 130 can maintain a data structure (e.g., a table, a list, or any other technically feasible data structure) in non-persistent memory that stores block IDs of blocks not yet available for reallocation. This ensures that the one or more blocks cannot be reallocated until the client completes its deallocation transaction. In some embodiments, steps 306 and 308 can be performed in parallel. In some embodiments, the update to the allocator data structure to deallocate the one or more blocks may be combined with other allocator data structure updates (e.g., updates associated with other allocation and/or deallocation transactions), which further reduces the overhead of step 306.

After steps 306 and 308 are complete, at a step 310, the block allocator of block management layer 130 notifies the client of the persistence of the deallocation. Block management layer 130 can send a signal, message, and/or the like to the client indicating that the deallocation is persistent.

If a crash happens prior to step 304, block management layer 130 has no knowledge or record of the deallocation. Accordingly, the client can process the tentative deallocation entry from the log and can either choose to abort the deallocation transaction or continue with the deallocation transaction. If the client chooses to abort, then the client can cancel the entry logged in step 302. If the client chooses to continue, the client can proceed from step 304 and re-request the deallocation based on the entry logged in step 302.

If a crash happens sometime from step 304 up to step 310, the client can safely reissue the deallocation request of step 304 to the block allocator of block management layer 130 without running the risk of a multiple reallocation of the one or more blocks because at block management layer 130 the deallocation either has not occurred yet, or has occurred and a reallocation hold has been placed. In response to the reissued deallocation request, block management layer 130 can proceed from step 306 to update the allocator data structure(s) and/or record the deallocated block IDs in non-persistent memory.

Upon receiving the notification, at a step 312, the client finalizes the deallocation transaction in the log. In some embodiments, the finalization of the deallocation transaction in the log includes adding an entry in the log that indicates that the deallocation associated with the tentative update recorded in step 302 is complete. Accordingly, the log can include, for a given completed deallocation transaction, an entry that indicates that the deallocation is tentative and an entry that indicates that the deallocation is complete. Thus, upon recovery from a crash, deallocations recorded in the log can be checked for completeness by checking whether a tentative deallocation entry has a corresponding completed deallocation entry in the log. In some embodiments, finalization of the deallocation transaction in the log may be combined with the finalization of other deallocation transactions in the log, which further reduces the overhead of step 308.

At a step 314, the client requests that the block allocator of block management layer 130 finalize the deallocation of the one or more blocks. For example, file system layer 120 can issue, via the block allocation/deallocation API, a call (e.g., FinalizeDeallocation( )) to block management layer 130 to finalize the deallocation.

At a step 316, in response to the call to finalize the deallocation, the block allocator of block management layer 130 makes the one or more blocks available for reallocation by removing the record to prevent reallocation of the one or more blocks from memory. If a crash happens from step 312 or after, in particular after the finalization of the deallocation in the log, there is nothing to recover and the one or more blocks become available for allocation after the recovery from the crash, as the record to prevent reallocation of the blocks, made in step 308, was recorded in non-persistent memory and is thus lost in the crash. Accordingly, the client need not re-request that the deallocation be finalized as in step 314.

Exemplary Virtualization System Architectures

According to some embodiments, all or portions of any of the foregoing techniques can be partitioned into one or more modules and instanced within, or as, or in conjunction with a virtualized controller in a virtual computing environment. Some example instances within various virtual computing environments are shown and discussed in further detail in FIGS. 4A-4D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 4A:
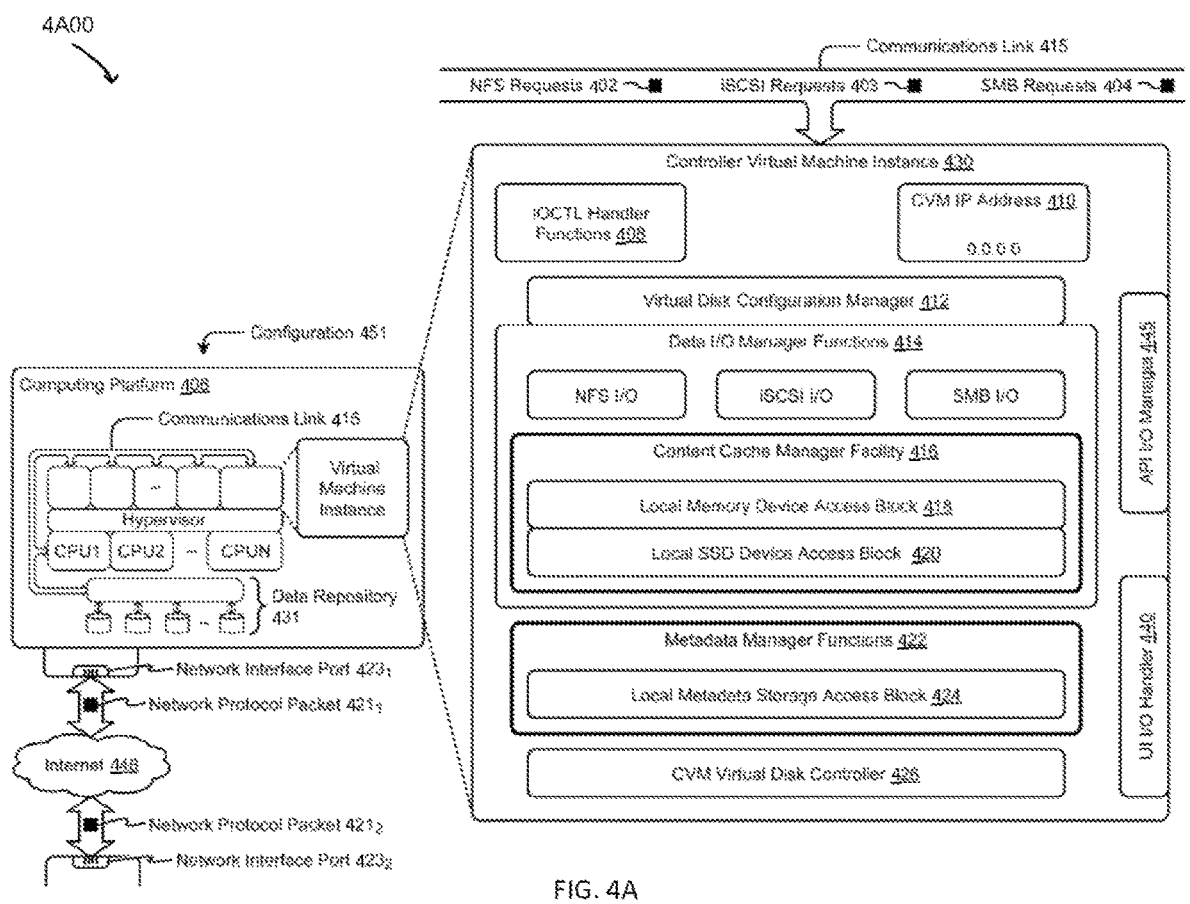
FIGS. 4A-4D are block diagrams illustrating virtualization system architectures configured to implement one or more aspects of the present embodiments.

FIG. 4A is a block diagram illustrating virtualization system architecture 4A00 configured to implement one or more aspects of the present embodiments. As shown in FIG. 4A, virtualization system architecture 4A00 includes a collection of interconnected components, including a controller virtual machine (CVM) instance 430 in a configuration 451. Configuration 451 includes a computing platform 406 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 430.

In this and other configurations, a CVM instance receives block I/O storage requests as network file system (NFS) requests in the form of NFS requests 402, internet small computer storage interface (iSCSI) block IO requests in the form of iSCSI requests 403, Samba file system (SMB) requests in the form of SMB requests 404, and/or the like. The CVM instance publishes and responds to an internet protocol (IP) address (e.g., CVM IP address 410). Various forms of input and output can be handled by one or more IO control handler functions (e.g., IOCTL handler functions 408) that interface to other functions such as data IO manager functions 414 and/or metadata manager functions 422. As shown, the data IO manager functions can include communication with virtual disk configuration manager 412 and/or can include direct or indirect communication with any of various block IO functions (e.g., NFS IO, iSCSI IO, SMB IO, etc.).

In addition to block IO functions, configuration 451 supports IO of any form (e.g., block IO, streaming IO, packet-based IO, HTTP traffic, etc.) through either or both of a user interface (UI) handler such as UI IO handler 440 and/or through any of a range of application programming interfaces (APIs), possibly through API IO manager 445.

Communications link 415 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 406 include one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory (RAM). As shown, controller virtual machine instance 430 includes content cache manager facility 416 that accesses storage locations, possibly including local dynamic random access memory (DRAM) (e.g., through local memory device access block 418) and/or possibly including accesses to local solid state storage (e.g., through local SSD device access block 420).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 431, which in turn can be formatted into any one or more storage areas, and which can comprise a parameterized storage accessible by a key (e.g., a filename, a table name, a block address, an offset address, etc.). Data repository 431 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 424. The data repository 431 can be configured using CVM virtual disk controller 426, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 451 can be coupled by communications link 415 (e.g., backplane, LAN, PSTN, wired or wireless network, etc.) and each instance may perform respective portions of sequences of instructions as may be required to practice embodiments of the disclosure.

The shown computing platform 406 is interconnected to the Internet 448 through one or more network interface ports (e.g., network interface port $423_1$ and network interface port $423_2$). Configuration 451 can be addressed through one or more network interface ports using an IP address. Any operational element within computing platform 406 can perform sending and receiving operations using any of a range of network protocols, possibly including network protocols that send and receive packets (e.g., network protocol packet $421_1$ and network protocol packet $421_2$).

Computing platform 406 may transmit and receive messages that can be composed of configuration data and/or any other forms of data and/or instructions organized into a data structure (e.g., communications packets). In some cases, the data structure includes program instructions (e.g., application code) communicated through the Internet 448 and/or through any one or more instances of communications link 415. Received program instructions may be processed and/or executed by a CPU as it is received and/or program instructions may be stored in any volatile or non-volatile storage for later execution. Program instructions can be transmitted via an upload (e.g., an upload from an access device over the Internet 448 to computing platform 406). Further, program instructions and/or the results of executing program instructions can be delivered to a particular user via a download (e.g., a download from computing platform 406 over the Internet 448 to an access device).

Configuration 451 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 4B:
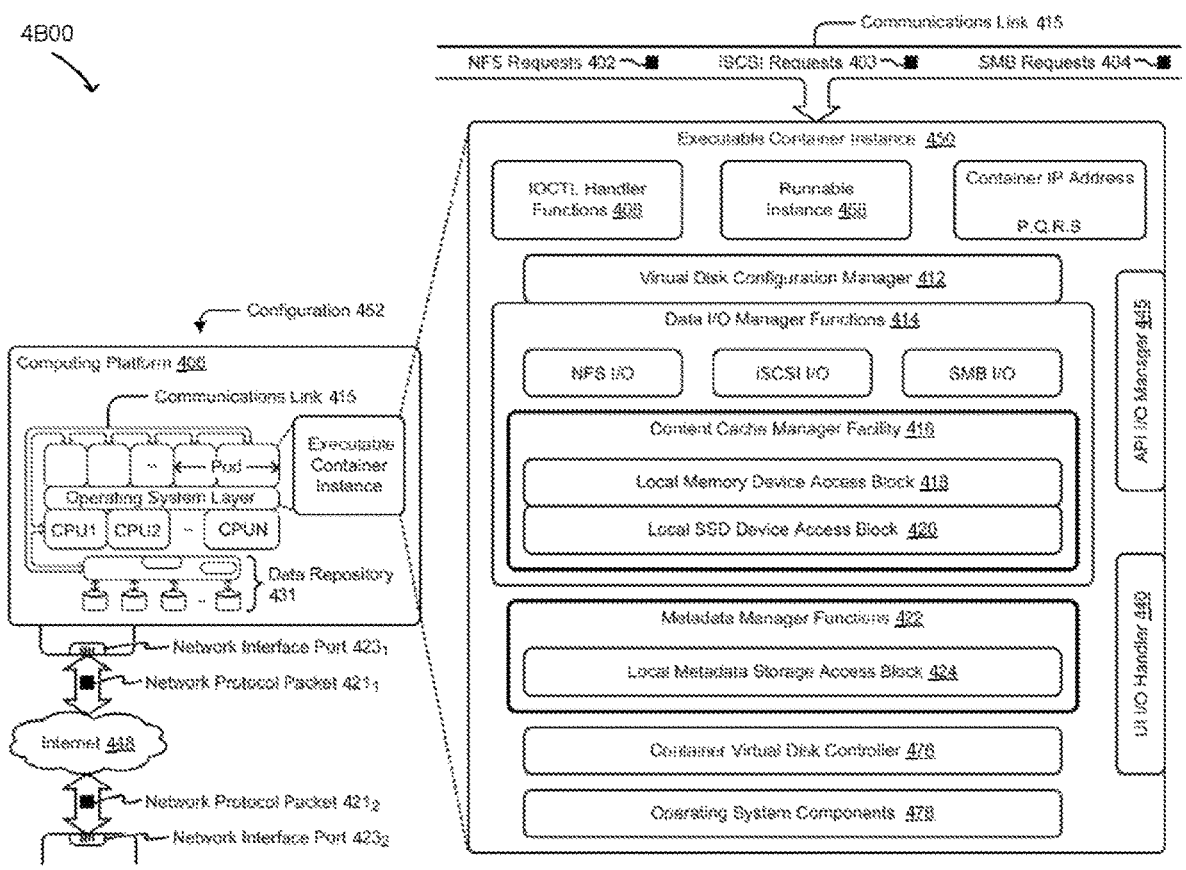

FIG. 4B depicts a block diagram illustrating another virtualization system architecture 4B00 configured to implement one or more aspects of the present embodiments. As shown in FIG. 4B, virtualization system architecture 4B00 includes a collection of interconnected components, including an executable container instance 450 in a configuration 452. Configuration 452 includes a computing platform 406 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 450). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls -a", etc.). The executable container might optionally include operating system components 478, however such a separate set of operating system components need not be provided. As an alternative, an executable container can include runnable instance 458, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 476. Such a container virtual disk controller can perform any of the functions that the aforementioned CVM virtual disk controller 426 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 4C:
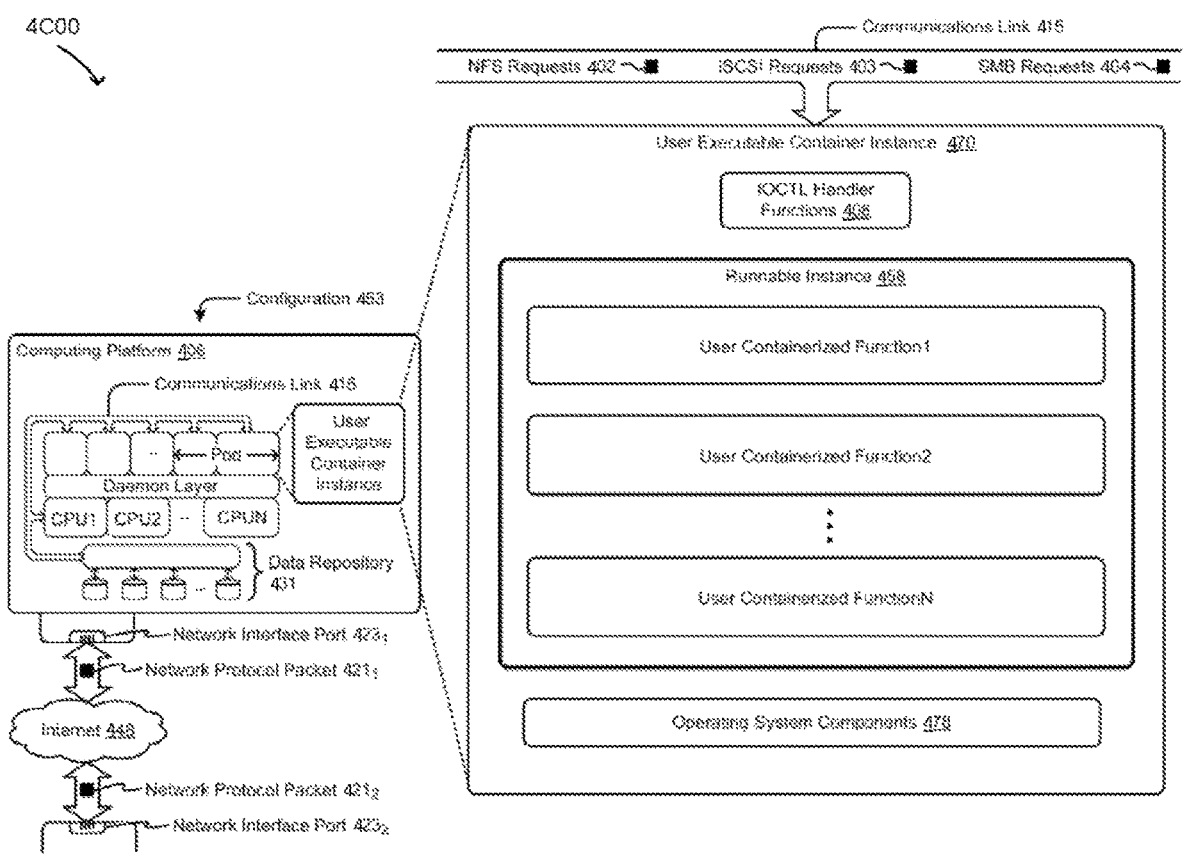

FIG. 4C is a block diagram illustrating virtualization system architecture 4C00 configured to implement one or more aspects of the present embodiments. As shown in FIG. 4C, virtualization system architecture 4C00 includes a collection of interconnected components, including a user executable container instance in configuration 453 that is further described as pertaining to user executable container instance 470. Configuration 453 includes a daemon layer (as shown) that performs certain functions of an operating system.

User executable container instance 470 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 458). In some cases, the shown operating system components 478 comprise portions of an operating system, which portions are interfaced with or included in the runnable instance and/or any user containerized functions. In some embodiments of a daemon-assisted containerized architecture, computing platform 406 might or might not host operating system components other than operating system components 478. More specifically, the shown daemon might or might not host operating system components other than operating system components 478 of user executable container instance 470.

In some embodiments, the virtualization system architecture 4A00, 4B00, and/or 4C00 can be used in any combination to implement a distributed platform that contains multiple servers and/or nodes that manage multiple tiers of storage where the tiers of storage might be formed using the shown data repository 431 and/or any forms of network accessible storage. As such, the multiple tiers of storage may include storage that is accessible over communications link 415. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiment, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 451) to manage the interactions between the underlying hardware and user virtual machines or containers that run client software.

Distinct from user virtual machines or user executable containers, a special controller virtual machine (e.g., as depicted by controller virtual machine instance 430) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 4D:
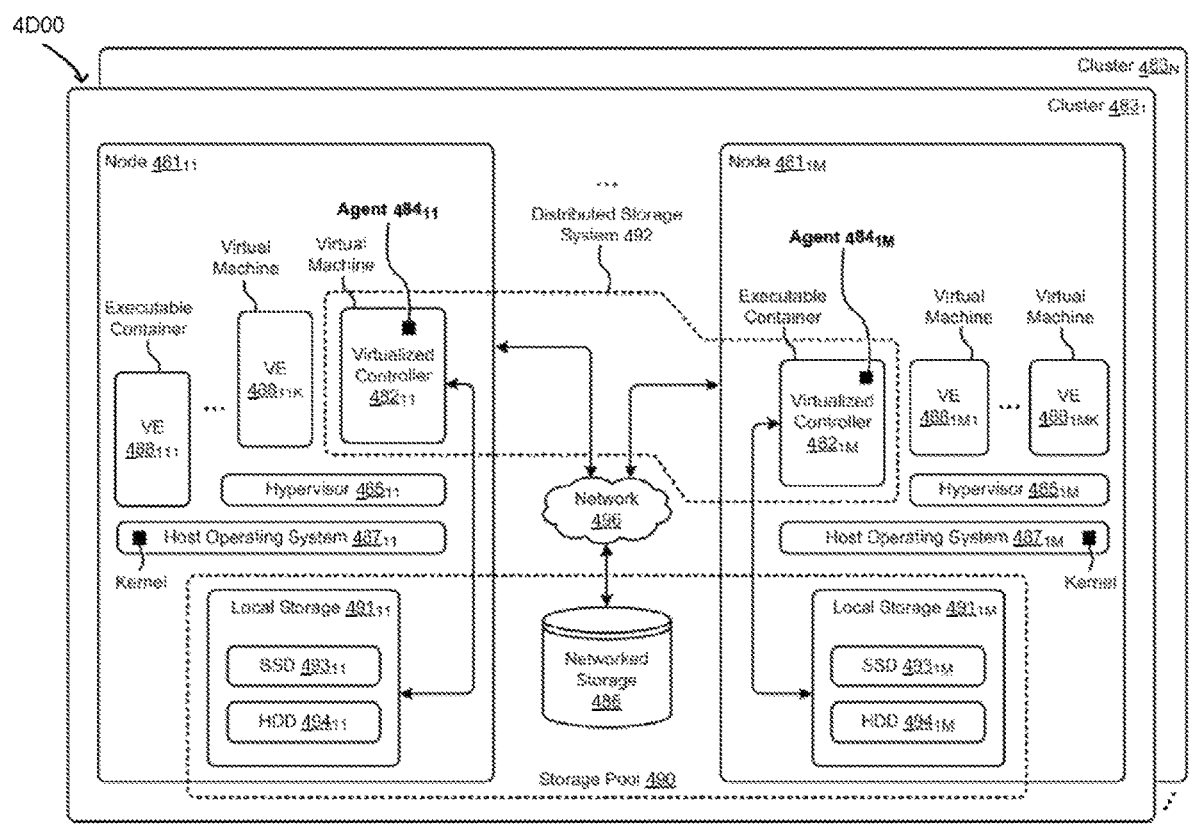

FIG. 4D is a block diagram illustrating virtualization system architecture 4D00 configured to implement one or more aspects of the present embodiments. As shown in FIG. 4D, virtualization system architecture 4D00 includes a distributed virtualization system that includes multiple clusters (e.g., cluster $483_1$, . . . , cluster $483_N$) comprising multiple nodes that have multiple tiers of storage in a storage pool. Representative nodes (e.g., node $481_{11}$, . . . , node $481_{1M}$) and storage pool 490 associated with cluster $483_1$ are shown. Each node can be associated with one server, multiple servers, or portions of a server. The nodes can be associated (e.g., logically and/or physically) with the clusters. As shown, the multiple tiers of storage include storage that is accessible through a network 496, such as a networked storage 486 (e.g., a storage area network or SAN, network attached storage or NAS, etc.). The multiple tiers of storage further include instances of local storage (e.g., local storage $491_{11}$, . . . , local storage $491_{1M}$). For example, the local storage can be within or directly attached to a server and/or appliance associated with the nodes. Such local storage can include solid state drives (SSD $493_{11}$, . . . , SSD $493_{1M}$), hard disk drives (HDD $494_{11}$, . . . , HDD $494_{1M}$), and/or other storage devices.

As shown, any of the nodes of the distributed virtualization system can implement one or more user virtualized entities (e.g., VE $488_{111}$, . . . , VE $488_{11K}$, . . . , VE $488_{1M1}$, . . . , VE $488_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $487_{11}$, . . . , host operating system $487_{1M}$), while the VMs run multiple applications on various respective guest operating systems. Such flexibility can be facilitated at least in part by a hypervisor (e.g., hypervisor $485_{11}$, . . . , hypervisor $485_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $487_{11}$, ..., host operating system $487_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 490 by the VMs and/or the executable containers.

Multiple instances of such virtualized controllers can coordinate within a cluster to form the distributed storage system 492 which can, among other operations, manage the storage pool 490. This architecture further facilitates efficient scaling in multiple dimensions (e.g., in a dimension of computing power, in a dimension of storage space, in a dimension of network bandwidth, etc.).

In some embodiments, a particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $481_{11}$ can interface with a controller virtual machine (e.g., virtualized controller $482_{11}$) through hypervisor $485_{11}$ to access data of storage pool 490. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 492. For example, a hypervisor at one node in the distributed storage system 492 might correspond to software from a first vendor, and a hypervisor at another node in the distributed storage system 492 might correspond to a second software vendor. As another virtualized controller implementation example, executable containers can be used to implement a virtualized controller (e.g., virtualized controller $482_{1M}$) in an operating system virtualization environment at a given node. In this case, for example, the virtualized entities at node $481_{1M}$ can access the storage pool 490 by interfacing with a controller container (e.g., virtualized controller $482_{1M}$) through hypervisor $485_{1M}$ and/or the kernel of host operating system $487_{1M}$.

In some embodiments, one or more instances of an agent can be implemented in the distributed storage system 492 to facilitate the herein disclosed techniques. Specifically, agent $484_{11}$ can be implemented in the virtualized controller $482_{11}$, and agent $484_{1M}$ can be implemented in the virtualized controller $482_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 5:
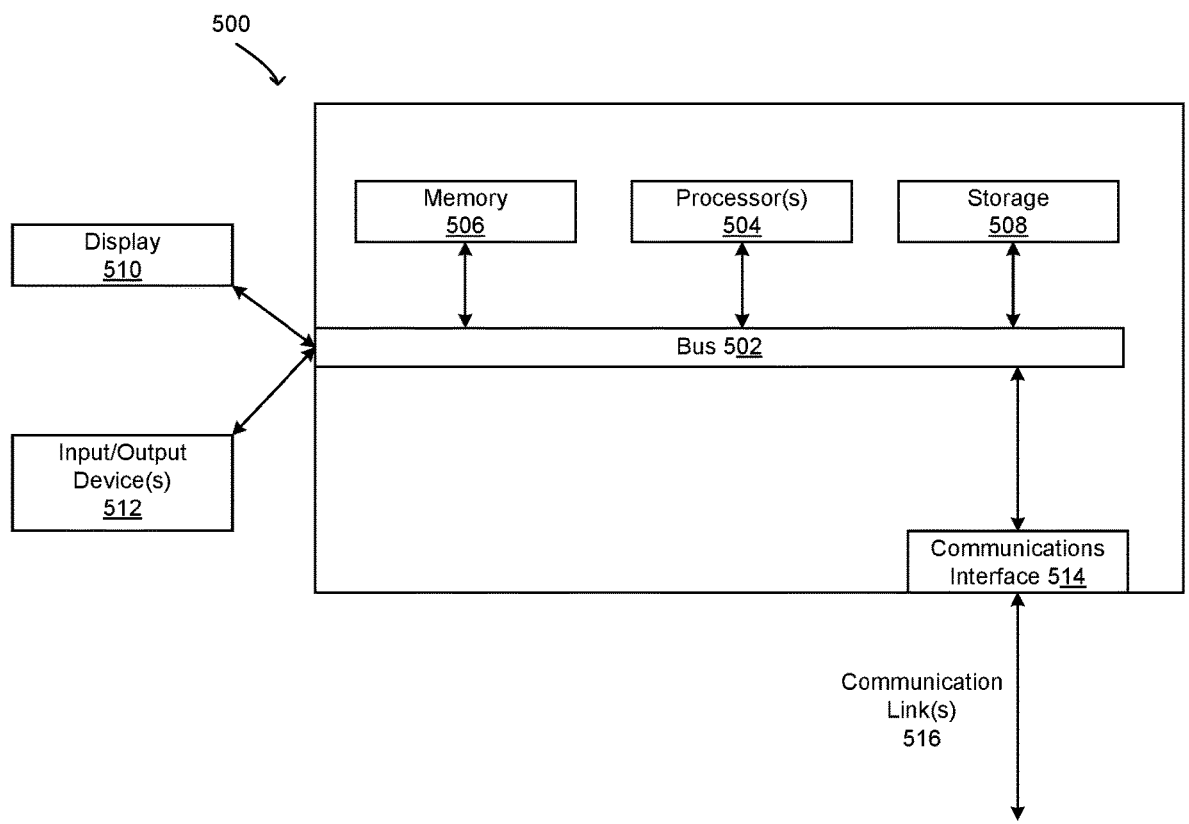
FIG. 5 is a block diagram illustrating a computer system configured to implement one or more aspects of the present embodiments.

FIG. 5 is a block diagram illustrating a computer system 500 configured to implement one or more aspects of the present embodiments. In some embodiments, computer system 500 may be representative of a computer system for implementing one or more aspects of the embodiments disclosed in FIGS. 1-4D. In some embodiments, computer system 500 is a server machine operating in a data center or a cloud computing environment. suitable for implementing an embodiment of the present disclosure. As shown, computer system 500 includes a bus 502 or other communication mechanism for communicating information, which interconnects subsystems and devices, such as one or more processors 504, memory 506, storage 508, optional display 510, one or more input/output devices 512, and a communications interface 514. Computer system 500 described herein is illustrative and any other technically feasible configurations fall within the scope of the present disclosure.

The one or more processors 504 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 504 may be any technically feasible hardware unit capable of processing data and/or executing software applications. Further, in the context of this disclosure, the computing elements shown in computer system 500 may correspond to a physical computing system (e.g., a system in a data center) or may be a virtual computing instance, such as any of the virtual machines described in FIGS. 4A-4D.

Memory 506 includes a random access memory (RAM) module, a flash memory unit, and/or any other type of memory unit or combination thereof. The one or more processors 504, and/or communications interface 514 are configured to read data from and write data to memory 506. Memory 506 includes various software programs that include one or more instructions that can be executed by the one or more processors 504 and application data associated with said software programs.

Storage 508 includes non-volatile storage for applications and data, and may include one or more fixed or removable disk drives, HDDs, SSD, NVMes, vDisks, flash memory devices, and/or other magnetic, optical, and/or solid state storage devices.

Communications interface 514 includes hardware and/or software for coupling computer system 500 to one or more communication links 515. The one or more communication links 515 may include any technically feasible type of communications network that allows data to be exchanged between computer system 500 and external entities or devices, such as a web server or another networked computing system. For example, the one or more communication links 515 may include one or more wide area networks (WANs), one or more local area networks (LANs), one or more wireless (WiFi) networks, the Internet, and/or the like.

In sum, a block store can allocate blocks of storage in a crash-consistent manner using a two-phase allocation transaction. A client requests allocation of blocks, and in response the block store allocates the blocks in a non-persistent manner and returns the block IDs of the allocated blocks to the client. The client records an entry indicating the tentative allocation in a log, and then requests finalization of the allocation. In response to the request to finalize the allocation, the block store makes the allocation persistent and reports to the completion of the allocation to the client. The client records an entry indicating the finalized allocation in the log.

The block store can also deallocate blocks of storage in a crash-consistent manner using a two-phase deallocation transaction. The client records an entry in a log indicating a tentative deallocation of blocks, and requests deallocation of the blocks. In response to the request to deallocate blocks, the block store makes the deallocation persistent, non-persistently places a hold on the deallocated blocks to prevent the blocks from reallocation, and reports the deallocation to the client. The client records an entry in a log indicating the finalized deallocation, and requests that the deallocation be finalized. In response to the request to finalize the deallocation, the block store lifts the hold on the deallocated blocks, making them available for reallocation.

At least one technical advantage of the disclosed techniques is that allocation and deallocation transactions in the block store use less resources compared to conventional techniques. Because one journal is kept, at the file system or client, to record allocation and deallocation transactions, less resources (e.g., I/O) are consumed to keep the journal up to date, compared to keeping multiple journals in conjunction with conventional techniques. Another technical advantage is that the allocation or deallocation transaction is crash-consistent throughout the transaction. Because one journal is kept, at the file system or client level, there is no issue of discrepancy between separate journals being kept by different a block management system and a file system or client. Recovery from a crash includes conforming block allocations to the one journal. Accordingly, there is no discrepancy between block allocations/deallocations and file system or client allocations/deallocations. These technical advantages provide one or more technological advancements over prior art approaches.

1. In some embodiments, one or more non-transitory computer-readable media store program instructions that, when executed by one or more processors, cause the one or more processors to perform steps of sending a first request to a block allocator, the first request causing a non-persistent allocation of a block, wherein the block is associated with a block identifier; adding a first entry in a log, the first entry recording the block identifier and indicating a tentative status for the allocation; sending a second request to the block allocator, the second request causing persistence of the allocation; and adding a second entry in the log, the second entry indicating a finalized status for the allocation.

2. The one or more non-transitory computer-readable media of clause 1, wherein causing the non-persistent allocation of the block comprises causing recording the allocation of the block in non-persistent memory.

3. The one or more non-transitory computer-readable media of clauses 1 or 2, wherein causing the persistence of the allocation comprises causing one or more allocator data structures in persistent storage to be updated based on the allocation.

4. The one or more non-transitory computer-readable media of any of clauses 1-3, wherein the steps further comprise receiving the block identifier from the block allocator.

5. The one or more non-transitory computer-readable media of any of clauses 1-4, wherein the steps further comprise associating the block identifier with an entity for which the block is allocated in the first entry.

6. The one or more non-transitory computer-readable media of any of clauses 1-5, wherein the log comprises a write-ahead log.

7. In some embodiments, a method for allocating a block in a block store comprises sending a first request to a block allocator, the first request causing a non-persistent allocation of a block, wherein the block is associated with a block identifier; adding a first entry in a log, the first entry recording the block identifier and indicating a tentative status for the allocation; sending a second request to the block allocator, the second request causing persistence of the allocation; and adding a second entry in the log, the second entry indicating a finalized status for the allocation.

8. The method of clause 7, wherein causing the non-persistent allocation of the block comprises causing recording the allocation of the block in non-persistent memory.

9. The method of clauses 7 or 8, wherein causing the persistence of the allocation comprises causing one or more allocator data structures in persistent storage to be updated based on the allocation.

10. The method of any of clauses 7-9, further comprising receiving the block identifier from the block allocator.

11. The method of any of clauses 7-10, further comprising associating the block identifier with an entity for which the block is allocated in the first entry.

12. The method of any of clauses 7-11, wherein the log comprises a write-ahead log.

13. In some embodiments, a system comprises a non-persistent memory storing a set of instructions; a persistent storage; and one or more processors that, when executing the set of instructions, are configured to send a first request to a block allocator, the first request causing allocation of a block in the non-persistent memory, wherein the block is associated with a block identifier; add a first entry in a log, the first entry recording the block identifier and indicating a tentative status for the allocation; send a second request to the block allocator, the second request causing persistence of the allocation in the persistent storage; and add a second entry in the log, the second entry indicating a finalized status for the allocation.

14. The system of clause 13, wherein causing the allocation of the block in the non-persistent memory comprises causing recording the allocation of the block in the non-persistent memory.

15. The system of clauses 13 or 14, wherein causing the persistence of the allocation in the persistent storage comprises causing one or more allocator data structures in the persistent storage to be updated based on the allocation.

16. The system of any of clauses 13-15, wherein the one or more processors, when executing the set of instructions, is further configured to receive the block identifier from the block allocator.

17. The system of any of clauses 13-16, wherein the one or more processors, when executing the set of instructions, is further configured to associate the block identifier with an entity for which the block is allocated in the first entry.

18. The system of any of clauses 13-17, wherein the log comprises a write-ahead log.

19. In some embodiments, one or more non-transitory computer-readable media store program instructions that, when executed by one or more processors, cause the one or more processors to perform the steps of adding a first entry in a log, the first entry recording a block identifier of a block; sending a first request to a block allocator, the first request causing deallocation of the block, and causing the block to be unavailable for reallocation by causing the block identifier to be recorded in a data structure in non-persistent memory; adding a second entry in the log, the second entry indicating a finalized status for the deallocation; and sending a second request to the block allocator, the second request causing the block to be made available for reallocation.

20. The one or more non-transitory computer-readable media of clause 19, wherein the first entry indicates a tentative status for the deallocation of the block.

21. The one or more non-transitory computer readable media of clauses 19 or 20, wherein causing the deallocation of the block comprises causing one or more allocator data structures in persistent storage to be updated based on the deallocation.

22. The one or more non-transitory computer-readable media of any of clauses 19-21, wherein causing the block to be made available for reallocation comprises causing the block identifier to be removed from the data structure in the non-persistent memory.

23. In some embodiments, a method for deallocating a block in a block store comprises adding a first entry in a log, the first entry recording a block identifier of a block; sending a first request to a block allocator, the first request causing deallocation of the block, and causing the block to be unavailable for reallocation by causing the block identifier to be recorded in a data structure in non-persistent memory; adding a second entry in the log, the second entry indicating a finalized status for the deallocation; and sending a second request to the block allocator, the second request causing the block to be made available for reallocation.

24. The method of clause 23, wherein the first entry indicates a tentative status for the deallocation of the block.

25. The method of clauses 23 or 24, wherein causing the deallocation of the block comprises causing one or more allocator data structures in persistent storage to be updated based on the deallocation.

26. The method of any of clauses 23-25, wherein causing the block to be made available for reallocation comprises causing the block identifier to be removed from the data structure in the non-persistent memory.

27. In some embodiments, a system comprises a non-persistent memory storing a set of instructions; a persistent storage; and one or more processors that, when executing the set of instructions, are configured to add a first entry in a log, the first entry recording a block identifier of a block; send a first request to a block allocator, the first request causing deallocation of the block in the persistent storage and causing the block to be unavailable for reallocation by causing the block identifier to be recorded in a data structure in non-persistent memory; add a second entry in the log, the second entry indicating a finalized status for the deallocation; and send a second request to the block allocator, the second request causing the block to be made available for reallocation.

28. The system of clause 27, wherein the first entry indicates a tentative status for the deallocation of the block.

29. The system of clauses 27 or 28, wherein causing the deallocation of the block in the persistent storage comprises causing one or more allocator data structures in the persistent storage to be updated based on the deallocation.

30. The system of any of clauses 27-29, wherein causing the block to be made available for reallocation comprises causing the block identifier to be removed from the data structure in the non-persistent memory.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:
    sending, from a file system layer to a block allocator, a first request causing an allocation of a block, wherein the allocation is initially non-persistent and the block is associated with a block identifier;
    adding, by the file system layer into a log, a first entry recording the block identifier and indicating a tentative status for the allocation;
    sending, from the file system layer, a second request to the block allocator, the second request causing the block allocator to update the allocation as persistent; and
    adding, by the file system layer into the log, a second entry indicating a finalized status for the allocation.

2. The one or more non-transitory computer-readable media of claim 1, wherein causing the allocation of the block that is initially non-persistent comprises causing recording the allocation of the block in non-persistent memory.

3. The one or more non-transitory computer-readable media of claim 1, wherein causing the allocation to become persistent comprises causing one or more allocator data structures in persistent storage to be updated based on the allocation.

4. The one or more non-transitory computer-readable media of claim 1, wherein the steps further comprise receiving, by the file system layer from the block allocator, the block identifier.

5. The one or more non-transitory computer-readable media of claim 1, wherein the steps further comprise associating, by the file system layer, the block identifier with an entity for which the block is allocated in the first entry.

6. The one or more non-transitory computer-readable media of claim 1, wherein the log comprises a write-ahead log.

7. A method for allocating a block in a block store, comprising:
    sending, from a file system layer to a block allocator, a first request causing an allocation of a block, wherein the allocation is initially non-persistent and the block is associated with a block identifier;
    adding, by the file system layer into a log, a first entry recording the block identifier and indicating a tentative status for the allocation;
    sending, from the file system layer, a second request to the block allocator, the second request causing the block allocator to update the allocation as persistent; and
    adding, by the file system layer into the log, a second entry indicating a finalized status for the allocation.

8. The method of claim 7, wherein causing the allocation of the block that is initially non-persistent comprises causing recording the allocation of the block in non-persistent memory.

9. The method of claim 7, wherein causing the allocation to become persistent comprises causing one or more allocator data structures in persistent storage to be updated based on the allocation.

10. The method of claim 7, further comprising receiving, by the file system layer from the block allocator, the block identifier.

11. The method of claim 7, further comprising associating, by the file system layer, the block identifier with an entity for which the block is allocated in the first entry.

12. The method of claim 7, wherein the log comprises a write-ahead log.

13. A system, comprising:
    a non-persistent memory storing a set of instructions;
    a persistent storage; and
    one or more processors that, when executing the set of instructions, are configured to:
        send, from a file system layer to a block allocator, a first request causing an allocation of a block in the non-persistent memory, wherein the allocation is initially non-persistent and the block is associated with a block identifier;
        add, by the file system layer into a log, a first entry recording the block identifier and indicating a tentative status for the allocation;
        send, from the file system layer, a second request to the block allocator, the second request causing the block allocator to update the allocation as persistent in the persistent storage; and
        add, by the file system layer into the log, a second entry indicating a finalized status for the allocation.

14. The system of claim 13, wherein causing the allocation of the block in the non-persistent memory comprises causing recording the allocation of the block in the non-persistent memory.

15. The system of claim 13, wherein causing the allocation to become persistent in the persistent storage comprises causing one or more allocator data structures in the persistent storage to be updated based on the allocation.

16. The system of claim 13, wherein the one or more processors, when executing the set of instructions, is further configured to receive, by the file system layer from the block allocator, the block identifier.

17. The system of claim 13, wherein the one or more processors, when executing the set of instructions, is further configured to associate, by the file system layer, the block identifier with an entity for which the block is allocated in the first entry.

18. The system of claim 13, wherein the log comprises a write-ahead log.

19. One or more non-transitory computer-readable media storing program instructions that, when executed by one or more processors, cause the one or more processors to perform the steps of:
    adding, by a file system layer into a log, a first entry recording a block identifier of a block;
    sending, from the file system layer to a block allocator, a first request causing a deallocation of the block, and causing the block to be unavailable for reallocation by causing the block identifier to be recorded in a data structure in non-persistent memory;

adding, by the file system layer into the log, a second entry indicating a finalized status for the deallocation; and sending, from the file system layer the block allocator, a second request causing the block to be made available for reallocation.

20. The one or more non-transitory computer-readable media of claim 19, wherein the first entry indicates a tentative status for the deallocation of the block.

21. The one or more non-transitory computer-readable media of claim 19, wherein causing the deallocation of the block comprises causing one or more allocator data structures in persistent storage to be updated based on the deallocation.

22. The one or more non-transitory computer-readable media of claim 19, wherein causing the block to be made available for reallocation comprises causing the block identifier to be removed from the data structure in the non-persistent memory.

23. A method for deallocating a block in a block store, comprising:

adding, by a file system layer into a log, a first entry recording a block identifier of a block;

sending, from the file system layer to a block allocator, a first request causing a deallocation of the block, and causing the block to be unavailable for reallocation by causing the block identifier to be recorded in a data structure in non-persistent memory;

adding, by the file system layer into the log, a second entry indicating a finalized status for the deallocation; and sending, from the file system layer the block allocator, a second request causing the block to be made available for reallocation.

24. The method of claim 23, wherein the first entry indicates a tentative status for the deallocation of the block.

25. The method of claim 23, wherein causing the deallocation of the block comprises causing one or more allocator data structures in persistent storage to be updated based on the deallocation.

26. The method of claim 23, wherein causing the block to be made available for reallocation comprises causing the block identifier to be removed from the data structure in the non-persistent memory.

27. A system, comprising:

a non-persistent memory storing a set of instructions;

a persistent storage; and one or more processors that, when executing the set of instructions, are configured to:

add, by a file system layer into a log, a first entry recording a block identifier of a block;

send, from the file system layer a block allocator, a first request causing a deallocation of the block in the persistent storage and causing the block to be unavailable for reallocation by causing the block identifier to be recorded in a data structure in non-persistent memory;

add, by the file system layer, into the log, a second entry indicating a finalized status for the deallocation; and send, from the file system layer to the block allocator, a second request causing the block to be made available for reallocation.

28. The system of claim 27, wherein the first entry indicates a tentative status for the deallocation of the block.

29. The system of claim 27, wherein causing the deallocation of the block in the persistent storage comprises causing one or more allocator data structures in the persistent storage to be updated based on the deallocation.

30. The system of claim 27, wherein causing the block to be made available for reallocation comprises causing the block identifier to be removed from the data structure in the non-persistent memory.

* * * * *